US006677033B2

(12) United States Patent
Bloom et al.

(10) Patent No.: US 6,677,033 B2
(45) Date of Patent: Jan. 13, 2004

(54) IN SITU FLUOROPOLYMER POLYMERIZATION INTO POROUS SUBSTRATES

(75) Inventors: Joy Sawyer Bloom, Wilmington, DE (US); Kiu-Seung Lee, Philadelphia, PA (US); Robert Clayton Wheland, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/925,213

(22) Filed: Aug. 9, 2001

(65) Prior Publication Data

US 2002/0002219 A1 Jan. 3, 2002

Related U.S. Application Data

(62) Division of application No. 09/409,207, filed on Sep. 30, 1999, now Pat. No. 6,306,989.

(51) Int. Cl.[7] ........................ C08L 33/24; C08L 27/12; C08L 27/18

(52) U.S. Cl. ................ 428/308.4; 428/224; 428/473.5; 428/474.4; 428/476.3; 428/537.5; 428/308.8; 521/134; 526/242; 526/250

(58) Field of Search .......................... 521/134; 428/224, 428/308.4, 476.3, 308.8

(56) References Cited

U.S. PATENT DOCUMENTS

| | | | | | |
|---|---|---|---|---|---|
| 3,658,626 | A | | 4/1972 | Berger et al. | 156/441 |
| 3,847,657 | A | | 11/1974 | Rieber et al. | 117/135.5 |
| 3,912,449 | A | | 10/1975 | Mares et al. | |
| 3,962,171 | A | | 6/1976 | Robbins | |
| 3,993,827 | A | * | 11/1976 | Dukert | 428/251 |
| 4,737,571 | A | | 4/1988 | Hodge et al. | 528/336 |
| 5,073,440 | A | | 12/1991 | Lee | 428/224 |
| 5,114,652 | A | | 5/1992 | Lee | 264/184 |
| 5,116,650 | A | | 5/1992 | Bowser | 428/34 |
| 5,156,780 | A | | 10/1992 | Kenigsberg et al. | 264/22 |
| 5,217,802 | A | | 6/1993 | Scarmoutzos | 428/304.4 |
| 5,296,543 | A | | 3/1994 | Kasowski et al. | 524/606 |
| 5,418,006 | A | | 5/1995 | Roth et al. | 427/154 |
| 5,462,586 | A | | 10/1995 | Sugiyama et al. | 96/13 |
| 5,698,303 | A | * | 12/1997 | Caldwell | 428/215 |
| 5,721,283 | A | | 2/1998 | Howard, Jr. et al. | 521/60 |
| 5,773,098 | A | | 6/1998 | Thomas | 427/490 |
| 5,789,523 | A | | 8/1998 | George et al. | 528/170 |
| 5,840,775 | A | | 11/1998 | Howard, Jr. et al. | 521/64 |
| 6,071,602 | A | * | 6/2000 | Caldwell | 428/224 |
| 6,289,841 | B1 | * | 9/2001 | Caldwell | 118/33 |
| 6,558,743 | B1 | | 5/2003 | Crompton | |

FOREIGN PATENT DOCUMENTS

| | | |
|---|---|---|
| DE | 2108363 | 9/1972 |
| EP | 0 890 579 | 1/1999 |
| FR | 2110385 | 7/1972 |
| FR | 2148432 | 3/1973 |
| FR | 2156786 | 6/1973 |
| FR | 2 614 047 | 10/1988 |
| SU | 1551763 | 3/1990 |
| WO | WO 93/11293 | 6/1993 |

OTHER PUBLICATIONS

Wegner, Theodore H. et al., Wood, *Kirk–Othmer Encyclopedia of Chemical Technology*, 24, 579–611, 1984 (1984 John Wiley & Sons, Inc.—Canada).

Robinovitz, Karen, Too Tough To Take A Spill, *The New York Times*, Section 9, p. 3, Column 2, Oct. 11, 1998 (New York).

JP5–318413–abstract—Process for the Production of Modified Wood, Patent Bureau of Japan, Dec. 3, 1993.

Arefi, F. et al., Evolution des proprietes physicochimiques et dielectriques d'un materiau poreux type papier par encapsulation polymerique de 1,1 difluoroethylene sous decharge couronne a la pression atmospherique, *Revue Internationale Des Hautes Temperatures Et Des Refractaires*, 23, 205–210, 1986 (Gif–sur–Yvette, France).

JP62059688 abstract—Database WPI– AN 1987–113251, Water Oil Repel Composition Contain Fluorine Based Water Oil Repel Polyether Type Fluorine Oil, *Derwent Publications Ltd*., Mar. 16, 1987 (London).

JP61086972 abstract—Database WPI, AN 1986–153122, Imparting oil and water repellency to wood—by co–graft polymerising high fluorinated monomers and vinyl monomers into wood surface, *Derwent Publications*, Feb. 5, 1986 (London).

* cited by examiner

*Primary Examiner*—Fred Zitomer

(57) ABSTRACT

The present invention relates to in situ polymerization of fluoropolymer into porous substrates, to improve resistance to wear, tear and creep, decay, and degradation by wetting, staining and warping, and to improve durability while maintaining the appearance of the substrate.

18 Claims, No Drawings

IN SITU FLUOROPOLYMER POLYMERIZATION INTO POROUS SUBSTRATES

This application is division of application Ser. No. 09/409,207, filed Sep. 30, 1999 U.S. Pat. No. 6,306,989.

FIELD OF THE INVENTION

This invention relates to the polymerization of fluoropolymers into porous substrates. The fluoropolymer/substrate network that is present on the surface of the substrate and is also deposited into the substrate at appreciable depths. Depending upon the proportion of fluoropolymer relative to substrate, the fluoropolymer may provide a protective coating for the substrate and/or the substrate may improve the physical properties of the fluoropolymer.

TECHNICAL BACKGROUND OF THE INVENTION

Porous materials have a host of uses. Common uses for leather and porous polyurethane are to produce clothing and furniture. Common uses for wood include use as a building material and for the production of furniture. Polyimide compositions are known to have unique performance characteristics, which make them suitable for uses in the form of bushings, seals, electrical insulators, compressor vanes, brake linings, and others as described in U.S. Pat. No. 5,789,523. Para-oriented aromatic polyamides (para-aramids) are used to make fiber substrates that are useful for wear resistant application.

All of the porous materials described may degrade and decay over time by staining, wetting, warping, tearing or wearing. It is desirable to treat porous materials to improve resistance to wear, tear, creep, decay, and degradation by wetting, staining and warping, and to improve durability while maintaining the appearance of the materials.

For many years, textiles have been chemically treated to improve water and oil repellency. Different applications are commercially available to protect different kinds of substrates from oil and water staining. For example, Scotchgard® brand protector for fabrics sold by the 3M Company, and Teflon® Fabric Protector sold by E. I. du Pont de Nemours and Company, are available to consumers for use with textiles and fabrics. The use of granular fluorocompounds is also discussed in Japanese Patent 05318413. The invention involves a method whereby a raw wood material is impregnated with a fluorinated microparticles having a diameter of 5 microns and a compound which changes to insoluble cured resin.

Other references include the treatment of microporous materials with fluoroacrylate to achieve permanent water and oil repellency. For example, U.S. Pat. No. 5,156,780 teaches a method for treating microporous substrates to achieve water and oil repellency while maintaining porosity. In the '780 method, the substrates are impregnated with a solution of monomer in a carrier solvent. The carrier solvent is first substantially removed from the substrate for the express purpose of leaving the monomer as a thin conformal coating on all internal and external substrate surfaces. In this manner, the monomer is converted to polymer and the polymer does not block the pores or restrict flow in subsequent use as a filtration membrane.

If enough fluoromonomer is polymerized into a porous structure, a point is reached at which there is more fluoropolymer than substrate and the composition can be considered a filled fluoropolymer. Fluoropolymers such as PTFE are commonly filled with substances such as glass fibers, graphite, asbestos, and powdered metals (Kirk-Othmer Encyclopedia of Chemical Technology, Fourth Edition, Volume 11, John Wiley and Sons, New York, pages 626 and 630). The filler is generally added for the purpose of improving some property of the fluoropolymer, such as creep or hardness.

Most often, filled fluoropolymers are made by physically mixing the fluoropolymer with the filler or by coagulating an aqueous fluoropolymer emulsion on the filler, but such methods have their problems. Adhesion of fluoropolymer to filler can be quite poor, particularly if the fluoropolymer does not wet the filler and penetrate its pores and finer surface features. Fluoropolymer melts can be very stiff making mixing/dispersion poor and nonuniform. Mechanical mixing can degrade some fillers, for example by breaking fine fibers. It is desirable to polymerize fluoromonomer onto the surface and into the pores of a substrate to achieve intimate fluoropolymer/substrate interpenetration and dispersion with minimal mechanical stress.

SUMMARY OF THE INVENTION

Disclosed in this invention is a process for preparing a fluoropolymer/substrate composition, comprising:

in the case of gaseous fluoromonomer (a) contacting a porous substrate with a solution comprising an initiator dissolved in a suitable solvent;

(b) exposing said substrate and said initiator to gaseous fluoromonomer under polymerization temperature and pressure conditions wherein the fluoromonomer polymerizes into said substrate;

or in the case of liquid fluoromonomer (a) preparing a solution comprising initiator and liquid fluoromonomer;

(b) contacting a porous substrate with said solution; and (c) polymerizing the liquid fluoromonomer under polymerization temperature and pressure conditions wherein the fluoromonomer polymerizes into said substrate, optionally in the presence of gaseous fluoromonomer.

Also disclosed is a composition of matter made by a process for preparing a fluoropolymer/substrate composition, comprising:

in the case of gaseous fluoromonomer (a) contacting a porous substrate with a solution comprising an initiator dissolved in a suitable solvent;

(b) exposing said substrate and said initiator to gaseous fluoromonomer under polymerization temperature and pressure conditions wherein the fluoromonomer polymerizes into said substrate;

or in the case of liquid fluoromonomer (a) preparing a solution comprising initiator and liquid fluoromonomer;

(b) contacting a porous substrate with said solution; and (c) polymerizing the liquid fluoromonomer under polymerization temperature and pressure conditions wherein the fluoromonomer polymerizes into said substrate optionally in the presence of gaseous fluoromonomer.

A further disclosure of the present invention is a composition of matter, comprising: a substrate having a surface wherein the substrate further comprises polymerized fluoropolymer, and wherein the substrate is an open pore structure having interconnecting pores throughout said substrate, and wherein fluoropolymer is present within and on the surface of said composition at a level from about 0.1 percent to about 300 percent of the weight of said substrate.

Also disclosed is the use of these compositions as filler materials for other polymers.

DETAILED DESCRIPTION OF THE INVENTION

The present invention discloses a fluoropolymer/substrate composition. The presence of fluoropolymer in the composition provides a protective material for the substrate and may also add aesthetic qualities to the substrate. A further advantage of the fluoropolymer/substrate composition is that the physical properties of the fluoropolymer are improved.

Also disclosed in the present invention is a method for preparing intimately interpenetrated fluoropolymer/substrate compositions that improve the functional lifetime and/or the appearance of any or all the components. The method disclosed for making the fluoropolymer/substrate composition leaves the initiator and the initiator carrier solvent in the substrate during polymerization and uses undiluted monomer or, in the preferred embodiment, gaseous monomer, to penetrate and block all pores to the greatest depth possible. In the present invention, the polymerized fluoromonomer partially or completely fills and blocks the pores of the substrate.

Coating the surface and blocking the pores of a substrate with fluoropolymer prevents or slows degradation by wetting and penetration of the substrate by agents such as water, acids, bases, foodstuffs, and cosmetics, thereby preventing staining, warping, and unwanted chemical or physical property changes in the substrate. As a case in point, the Ultrasuede®/PTFE composition of Example 8 below wets less readily than untreated Ultrasuede™. Coating the surface and blocking the pores of a substrate with fluoropolymer can also slow mechanical degradation by such means as abrasion, creep, or tearing. As a case in point, the polyimide/PTFE composition of Example 2A abraded 8× more slowly than untreated polyimide.

Going further, once the volume of polymerized fluoropolymer exceeds that of the substrate or once the fluoropolymer/substrate network has been blended into pure fluoropolymer, the substrate can then be considered as dispersed in the fluoropolymer for the purpose of modifying fluoropolymer properties. These compositions are commonly referred to as "filled fluoropolymer." For example, intimately interpenetrated porous polyimide or aramid particulates can be added to poly(tetrafluoroethylene) to potentially decrease PTFE creep. In a process disclosed in the present invention, the fluoromonomer is polymerized both on the surfaces and into the pores of a substrate to achieve intimate fluorpolymer/susbtrate interpenetration and dispersion. The filled fluoropolymer is prepared with minimal mechanical stress. This process reduces degradation, and thereby, offers a solution to the problem of degradation that occurs with mechanical mixing.

The invention involves a process for the in situ polymerization of fluoromonomer into substrates. Polymerization temperatures range from about 0° C. to about 300° C., preferably from about 0° C. to about 100° C., most preferably from about 5° C. to about 30° C. For those substrates that retain their rigid pore structures at high temperatures and do not thermally decompose, polymerizations can be run at temperatures up to about 300° C.

The process of the present invention uses fluoromonomer in either the gaseous or liquid state. Gaseous monomers include tetrafluoroethylene (TFE), trifluoroethylene, vinylidene fluoride, chlorotrifluoroethylene, hexafluoroisobutylene and perfluoro methyl vinyl ether. Liquid monomers include 4,5-difluoro-2,2-bis(trifluoromethyl)-1,3-dioxole (PDD), perfluoro (2-methylene-4-methyl-1,3-dioxolane (PMD) and perfluoro propyl vinyl ether. These monomers may be homopolymerized or copolymerized to make compositions known to those skilled in the art. Examples include tetrafluoroethylene homopolymer and tetrafluoroethylene/4,5-difluoro-2,2-bis(trifluoromethyl)-1,3-dioxole copolymer.

By "porous substrate" is meant any solid material penetrated throughout with interconnecting pores of a size such as to allow absorption of liquid initiator solution and monomer. The porous substrates can take any form including microscopic particulates, microscopic fibers, coarse particulates, pulp, fibrids, chunks, blocks, uncompressed, partially or fully compressed parts, sheets, films, membranes, and coatings. Porous substrates are not meant to include materials such as cloth where the only mechanism of fluoropolymer entrainment is gross entrapment between separate fibers rather than subsurface penetration into a substrate's pores. This process works with any porous substrate that does not inhibit fluoromonomer polymerization. Substrates not inhibiting polymerization include wood, wood by-products such as paper, p-aramid fibers, molded polyimide parts, porous polyurethane and leather. Whether a substrate will inhibit polymerization must be determined empirically substrate by substrate and may vary for the same substrate, depending upon prior finishing and treatment.

The present invention also provides a fluoropolymer/substrate composition wherein the substrates are open structures with interconnecting pores throughout their bulk and the level of fluoropolymer in the fluoropolymer/substrate composition is about 0.1% to about 300% of the weight of the substrate. Substrates useful in this invention include wood, paper, leather, porous polyurethane, and aramids and polyimides that have been precipitated as porous particulates or porous fibers and then left wet, dried, or molded only so far as to preserve enough porosity for subsequent penetration by fluoromonomer and initiator. Preferred substrates are porous aramid, polyimide particulates and polyimide parts.

When a preferred substrate is used, the porous aramid or polyimide is immersed for about 1 minute in a 0.1 to 0.2 M solution of hexafluoropropylene oxide dimer peroxide (DP) 1

$$CF_3CF_2CF_2OCF(CF_3)(C{=}O)OO(C{=}O)CF(CF_3OCF_2CF_2CF_3 \quad 1, \text{DP}$$

in $CF_3CFHCFHCF_2CF_3$ solvent. The excess solvent is filtered off or is drained from the aramid or polyimide, and the still damp polymer placed in a container with 1 atmosphere pressure of tetrafluoroethylene gas until the substrate has gained preferably 5 to 20% of its weight by polymerization of the tetrafluoroethylene to poly(tetrafluoroethylene).

The preferred aramids are poly(p-phenylene terephthalamide) (hereinafter "PPD-T") fibers and poly(m-phenylene isophthalamide)(hereinafter "MPD-I") in the form of fiber, particles, pulp or fibrids, that are dried, or never-dried. Examples of preferred aramids are poly(p-phenylene terephthalamide) fibers sold by the DuPont Company under the tradename "Kevlar®", and poly(m-phenylene isophthalamide) sold by the DuPont Company under the tradename Nomex®.

A "never-dried aramid" means an aramid coagulated from a solution by contact with a non-solvent (usually an aqueous bath of some sort, such as water or an aqueous solution). When contacted with the non-solvent, the polymer coagulates and most of the solvent is removed from the aramid. The aramid has an open sponge-like structure, which usually contains about 150–200% by weight of the aramid of non-solvent (again, usually water). It is this open sponge-like structure, which has imbibed the non-solvent, which is referred to herein as "never-dried aramid".

By PPD-T is meant the homopolymer resulting from mole-for-mole polymerization of p-phenylenediamine and terephthaloyl chloride and, also, copolymers resulting from incorporation of small amounts of other aromatic diamine with the p-phenylene diamine and of small amounts of other aromatic diacid chloride with the terephthaloyl chloride. Examples of other acceptable aromatic diamines include m-phenylene diamine, 4,4'-diphenyldiamine, 3,3'-diphenyldiamine, 3,4'-diphenyldiamine, 4,4'-oxydiphenyldiamine, 3,3'-oxydiphenyldiamine, 3,4'-oxydiphenyldiamine, 4,4'-sulfonyldiphenyldiamine, 3,3'-sulfonyldiphenyldiamine, 3,4'-sulfonyldiphenyldiamine, and the like. Examples of other acceptable aromatic diacid chlorides include 2,6-naphthalene-dicarboxylic acid chloride, isophthaloyl chloride, 4,4'-oxydibenzoyl chloride, 3,3'-oxydibenzoyl chloride, 3,4'-oxydibenzoyl chloride, 4,4'-sulfonyldibenzoyl chloride, 3,3'-sulfonyldibenzoyl chloride, 3,4'-sulfonyldibenzoyl chloride, 4,4'-dibenzoyl chloride, 3,3'-dibenzoyl chloride, 3,4'-dibenzoyl chloride, and the like. As a general rule, other aromatic diamines and other aromatic diacid chlorides can be used in amounts up to as much as about 10 mole percent of the p-phenylene diamine or the terephthaloyl chloride, or perhaps slightly higher, provided only the other diamines and diacid chlorides have no reactive groups which interfere with the polymerization reaction.

By MPD-I is meant the homopolymer resulting from mole-for-mole polymerization of m-phenylenediamine and isophthaloyl chloride and, also, copolymers resulting from incorporation of small amounts of other aromatic diamine with the m-phenylene diamine and of small amounts of other aromatic diacid chloride with the isophthaloyl chloride. Examples of other acceptable aromatic diamines include p-phenylene diamine, 4,4'-diphenyldiamine, 3,3'-diphenyldiamine, 3,4'-diphenyldiamine, 4,4'-oxydiphenyldiamine, 3,3'-oxydiphenyldiamine, 3,4'-oxydiphenyldiamine, 4,4'-sulfonyldiphenyldiamine, 3,3'-sulfonyldiphenyldiamine, 3,4'-sulfonyldiphenyldiamine, and the like. Examples of other acceptable aromatic diacid chlorides include 2,6-naphthalene-dicarboxylic acid chloride, terephthaloyl chloride, 4,4'-oxydibenzoyl chloride, 3,3'-oxydibenzoyl chloride, 3,4'-oxydibenzoyl chloride, 4,4'-sulfonyldibenzoyl chloride, 3,3'-sulfonyldibenzoyl chloride, 3,4'-sulfonyldibenzoyl chloride, 4,4'-dibenzoyl chloride, 3,3'-dibenzoyl chloride, 3,4'-dibenzoyl chloride, and the like. As a general rule, other aromatic diamines and other aromatic diacid chlorides can be used in amounts up to as much as about 10 mole percent of the m-phenylene diamine or the isophthaloyl chloride, or perhaps slightly higher, provided only the other diamines and diacid chlorides have no reactive groups which interfere with the polymerization reaction.

The process invention disclosed herein works for most organic initiators commonly used for fluoroolefin polymerizations, including, but not limited to, diacylperoxides, peroxides, azos and peroxydicarbonates. The preferred initiator is DP. DP has a half-life of about 4 hours at 20° C. which means that DP lasts long enough for a polymerization run to be set up at room temperature without excessive initiator loss and yet DP still reacts fast enough at room temperature for polymerizations to run to completion fairly quickly. Preferred run times are from about 4 to about 24 hours.

In the preferred embodiment of this invention, the initiator is first synthesized in any solvent that is compatible with fluoroolefin polymerization and the initiator solution then absorbed into the substrate. Suitable solvents comprise chlorofluorocarbons such as Freon® 113 ($CFCl_2CF_2Cl$), hydrofluorocarbons, such as Vertrel® XF (HFC-43-10mee; 2,3-dihydroperfluoropentane) specialty fluid, perfluorocarbons, such as perfluorohexane, perfluoroethers, such as Fluorinert® FC-75 sold by 3M Company, perfluoroamines, such as Fluorinert® FC 40, and perfluorodialkylsulfides, such as $CF_3CF_2CF_2CF_2SCF_2CF_2CF_2CF_2CF_3$. The preferred solvents for DP are Vertrel® XF and Freon® E1($CF_3CF_2CF_2OCFHCF_3$).

In this invention, the preferred initiator solution comprises a solution of hexafluoropropylene oxide dimer peroxide [DP] in Vertrel® XF ($CF_3CFHCFHCF_2CF_3$). It is further preferred that the fluoromonomer used in this process is tetrafluoroethylene. TFE polymerizes to form PTFE.

Substrates specifically exemplified for the present invention include wood, molded polyimide parts, porous polyimide powder, porous para-aramids such as poly(para-phenylene terephthalamide) [PPD-T] in the forms of powder, pulp and/or fiber, and porous meta-aramids, such as poly(m-phenylene isophthalamide)[MPD-I] in the forms of powder, fibers or fibrids, porous polyurethane, and leather (pigskin and cowskin).

In the case of liquid fluoromonomer, such as PDD and PMD, the carrier solvent can be the monomer or the monomer containing a small amount of initiator solution (for example, DP in a Freon® solvent).

EXAMPLES

Example 1

TFE Polymerization into As-molded Polyimide Parts

A. Preparation of Molded Polyimide Test Bars with Variable Porosity

Polyimide resin powder used in the following Examples 1, 2 and 3 was prepared from pyromellitic dianhydride and 4,4'-oxydianiline, according to the procedures of U.S. Pat. No. 3,179,614 or U.S. Pat. No. 4,622,384. Polyimide powder samples weighing 2.1 to 2.5 g were cold pressed at room temperature into tensile bars. These tensile bars were dog-bone shaped, measuring 90 mm long by 5 mm to 10 mm wide. In order to vary the porosity of the tensile bars, six different compressive forces were used, 10,000 psi, 20,000 psi, 30,000 psi, 40,000 psi, 50,000 psi, and 100,000 psi, the resulting bars being called the 10K, 20K, 30K, 40K, 50K, and 100K bars respectively. After pressing, the bars had thicknesses typically running from 2.7 to 3.3 mm. When the bars were dried overnight in a 75° C. oven, they lost 1 to 3% of their weight. Pore volumes for dried polyimide powder starting material and dried tensile bars measured by nitrogen porosimetry are shown in the Table 1 below.

TABLE 1

| Sample | Pore Volume for Pores 17 to 3000Å |
|---|---|
| Starting Powder | 0.18 cc/g |
| 10 K Bar | 0.09 cc/g |
| 20 K Bar | 0.050 cc/g |
| 30 K Bar | 0.01 cc/g |
| 40 K Bar | 0.002 cc/g |
| 50 K Bar | nil |
| 100 K Bar | nil |

B. Atmospheric Pressure TFE Polymerization Tensile Tests

One each of a 10K, a 50K, and a 100K bar were soaked at −15° C. in initiator solution, a ~0.14 M DP 1 solution in Vertrel™ XF solvent ($CF_3CFHCFHCF_2CF_3$). After 3 hours, the bars were pulled from the initiator solution, excess initiator solution allowed to drain, and then loaded into a 6×9" ziplock polyethylene bag equipped with a gas inlet valve. The bag was evacuated and filled 3× with $N_2$ and then 3× with tetrafluoroethylene (TFE). The bag was inflated with TFE and allowed to stand ~20 hours overnight at room temperature. The next morning the three test bars were recovered and loose white PTFE powder was wiped off the surface. After 4 days of devolatilization under pump vacuum, the bars were reweighed with the weight changes shown in the table below. The bars were further compressed to 100,000 psi at room temperature. These bars were then finished by heating to 405° C. for three hours. Tensile tests on these bars are also shown in the table below versus control polyimide bars containing no PTFE. Fluorine analyses on the broken remains of the bars are shown in Table 2 below.

TABLE 2

| Sample | Nominal PTFE Weight Gain | PSI at Break | % Elongation at Break | Weight % Fluorine by Combustion Analysis |
|---|---|---|---|---|
| Control | | 11,500 | 10.9 | — |
| 10 K | 6.5 wt % | Broke when compressed | — | 2.0% F |
| 50 K | −0.5 wt % | 11,400 | 9.1 | 0.71% F |
| 100 K | −0.6 wt % | 11,000 | 11.3 | 0.17% F |

The apparent weight losses for the 50K and 100K bars needs comment. The starting polyimide powder and bars showed 1 to 3% weight loss when dried overnight at 75° C. The polyimide bars used here for TFE polymerizations were not dried before the TFE polymerization step but were devolatilized afterwards. The apparent weight change over the course of the experiment thus is the net result of volatiles loss and PTFE weight gain. Apparently volatiles loss is greater than PTFE weight gains for bars compressed at 50,000 and 100,000 psi.

C. High Pressure TFE Polymerization.

One each of a 10K, a 50K, and a 100K bar were soaked at −15° C. in initiator solution, a ~0.15 M DP 1 solution in Vertrel™ XF solvent ($CF_3CFHCFHCF_2CF_3$). After 30 minutes, the three bars were pulled from the initiator solution allowing excess initiator to drain away and then stored on dry ice until they could be loaded into a 400 ml autoclave prechilled to −20° C. The autoclave was evacuated and filled with 10 g of TFE. Polymerization was allowed to run overnight at room temperature, TFE pressure in the autoclave reaching a maximum of 111 psi at 16.3° C. The next morning, the test bars were recovered from a large volume of white PTFE fluff, using a tissue to wipe loose white PTFE off the surface. After 12 days of devolatilization under pump vacuum, the bars were analyzed for fluorine content by combustion analysis with the results shown in Table 3 below.

TABLE 3

| Bar | Fluorine by Combustion Analysis |
|---|---|
| 10 K | 13.97 wt % F |
| 50 K | 0.93 wt % F |
| 100 K | 0.51 wt % F |

The fluorine contents are higher than observed when the TFE polymerization was run at atmospheric pressure in section B immediately above.

D. Atmospheric Pressure Polymerization

Groups of four to eight 20K, 30K, and 40K bars were soaked at −15° C. in 20 to 30 ml of initiator solution, ~0.16 M DP 1 in Vertrel™ XF solvent ($CF_3CFHCFHCF_2CF_3$). After 60 minutes, the bars were pulled from the initiatior solution allowing excess initiator to drain away and then loaded into a 6×9" ziplock polyethylene bag equipped with a gas inlet valve. The bag was evacuated and filled 3× with $N_2$ and then 3× with tetrafluoroethylene (TFE). The bag was inflated with TFE and allowed to stand overnight at room temperature. The next morning the test bars were recovered, loose white PTFE powder wiped off the surface, and dried in a 75° C. vacuum oven. Three bars from each set were further compressed at 100,000 psi at room temperature and then sintered by raising temperature at 1.5° C./min to 405° C. and holding at 405° C. for 3 hours. Tensile tests were performed and the broken fragments analyzed for fluorine content as shown in the table below. The data results in Table 4 below show that polymerization of TFE into an as-molded polyimide bar does not have a major effect on ultimate tensile properties.

TABLE 4

| Test Bar | PSI at Break | Elongation at Break | Weight Percent Fluorine by Combustion Analysis: From Center of Bar | From End of Bar |
|---|---|---|---|---|
| 20 K | 10,980 | 14.5% | 0.79 | 0.59 |
| 20 K | 10,930 | 9.5% | | |
| 20 K | 10,676 | 8.5% | | |
| 30 K | 10,974 | 9.8% | 0.49 | 0.14 |
| 30 K | 10,209 | 6.3% | | |
| 30 K | 11,335 | 7.8% | | |
| 40 K | 11,241 | 8.5% | 0.66 | 0.56 |
| 40 K | 11,699 | 8.9% | | |
| 40 K | 11,312 | 8.1% | | |

Example 2

Porous Polyimide Powder, Atmospheric Pressure TFE Polymerization

A. Polyimide/PTFE Analysing for 6.34% Fluorine

A 500-ml round-bottomed flask loaded with 15.59 g of polyimide powder and ~55 ml of Vertrel™ XF was chilled overnight in a −15° C. refrigerator. The next morning 5 ml of ~0.16 M DP in Vertrel™ XF was added and then excess solvent was rapidly pulled off first using a rotary evaporator (~20 min) and then a vacuum pump (~13 min) so as to keep the reaction mixture cold by evaporative cooling. The polyimide powder, now impregnated with DP, was loaded into a 6×9" Ziplock® polyethylene bag equipped with a gas inlet valve. The bag was inflated and then evacuated 3× with $N_2$ and 3× with tetrafluoroethylene (TFE). The bag was inflated a final time with TFE and polymerization allowed to run until about half the TFE had been reacted as judged by visible deflation of the bag. This took about 72 minutes. The surface of the polyimide powder remained yellow indicating that the bulk of the PTFE polymerization was occurring within the pores of the particles rather than on the surface. The recovered polyimide powder weighed 19.33 g upon removal from the bag, 16.48 g after 147 minutes in a 75° C. vacuum oven, and 16.38 g after continuing another ~70 hours in the 75° C. vacuum oven. Weight gain was 0.79 g or 5.1% relative to the weight of the starting polyimide powder. Combustion analysis on the product found 6.34 wt % fluorine. Finding 6.34 wt % fluorine versus a 5.1 wt % gain overall is, as observed with the test bars above, consistent with starting with a raw polyimide powder that had not been devolatilized.

Samples of this powder were compressed at 100,000 psi at room temperature into three tensile bars measuring 90 mm long by 5 mm to 10 mm wide (dogbone-shaped). These bars were then finished by heating to 405° C. for three hours. In tensile tests these bars broke on average at 6,675 psi with 4.7% elongation. Combustion analysis on the broken pieces found 4.99 wt % fluorine.

The polyimide/PTFE composite made in this experiment was tested for resistance to wear using the method described in U.S. Pat. No. 5,789,523, column 4, line 51. The powder was compressed at 100,000 psi into a disk 1" in diameter by about 0.25" thick. This disk was then heated to 405° C. for three hours. After cooling to room temperature, the parts were machined to final dimensions for test specimens. The 0.25" (6.35 mm wide) contact surface of the wear/friction disk was machined to such a curvature that it conformed to the outer circumference of the 1.375" (34.9 mm) diameter× 0.375" (9.5 mm) wide metal mating ring. The disks were oven dried and maintained dry over desiccant until tested. Wear tests were performed using a Falex No. 1 Ring and Block Wear and Friction Tester. The equipment is described in ASTM Test method D2714. After weighing, the dry polyimide/PTFE disk was mounted against the rotating metal ring and loaded against it with the selected test pressure. Rotational velocity of the ring was set at the desired speed. No lubricant was used between the mating surfaces. The rings were SAE 4620 steel, Rc 58–63, 6–12 RMS. A new ring was used for each test. Test time was usually 24 hours, except when friction and wear were high, in which case the test was terminated early. At the end of the test time, the block was disconnected, weighed, and the wear calculated using the following calculation:

$$\text{Wear volume (cc/hr)} = \frac{\text{Weight Lost (grams)}}{\text{Material density (grams/cc)} \times \text{Test duration (hours)}}$$

In this test the wear volume of the polyimide/PTFE sample was at least 8× less than for a polyimide sample free of PTFE.

B. Polyimide/PTFE Analyzing for 14.15% Fluorine

A 500-ml round-bottomed flask loaded with 15.82 g of polyimide powder and ~55 ml of Vertrel® XF was chilled for 1 hour in a −15° C. refrigerator. About 5 ml of ~0.16 M DP in Vertrel® XF was added and then excess solvent was rapidly pulled off first using a rotary evaporator (10–15 min) and then a vacuum pump (~5 min) so as to keep the reaction mixture cold by evaporative cooling. The polyimide powder, now impregnated with DP was loaded into a 6×9" ziplock polyethylene bag equipped with a gas inlet valve. The bag was purged of air by inflating and evacuating the bag 3× with $N_2$ and 3× with tetrafluoro-ethylene (TFE). Polymerization was started by inflating the bag with TFE and allowing polymerization to deflate the bag over about a 2 hour period. The still yellow polyimide powder was dried overnight in an 88° C. vacuum oven. Combustion analysis on the product found 14.15 wt % fluorine.

Samples of this powder were compressed at 100,000 psi at room temperature into three tensile bars measuring 90 mm long by 5 mm to 10 mm wide (dogbone-shaped). These bars were then heated from to 405° C. for three hours. In tensile tests these bars broke on average at 1,369 psi with 0.5% elongation. Combustion analysis on the broken pieces found 13.89 wt % fluorine.

C. Polyimide/PTFE Analysing for 19.93% Fluorine

A 500-ml round-bottomed flask loaded with 15.51 g of polyimide powder and ~55 ml of Vertrel™ XF was chilled for 1 hour in a −5° C. refrigerator. About 5 ml of ~0.16 M DP in Vertrel™ XF was added and then excess solvent was rapidly pulled off first using a rotary evaporator (~15 min) and then a vacuum pump (~4 min) so as to keep the reaction mixture cold by evaporative cooling. The polyimide powder, now impregnated with DP, was loaded into a 6×9" ziplock polyethylene bag equipped with a gas inlet valve. The bag was purged of air by inflating and evacuating the bag 3× with $N_2$ and 3× with tetrafluoroethylene (TFE). Polymerization was started by repeatedly inflating the bag with TFE and allowing polymerization to deflate the bag twice, the deflations taking 40 minutes and overnight respectively. The still yellow polyimide powder was dried for ~4 days in a 75° C. vacuum oven. Combustion analysis on the product found 19.93 wt % fluorine.

Samples of this powder were compressed at 100,000 psi at room temperature into three tensile bars measuring 90 mm long by 5 mm to 10 mm wide (dogbone-shaped). These bars were then heated to 405° C. for three hours. In tensile tests these bars broke on average at 1,385 psi with 0.6% elongation. Combustion analysis on the broken pieces found 18.76 wt % fluorine.

D. Polyimide/PTFE Analysing for 23.99% Fluorine

A 500-ml round-bottomed flask loaded with 15.66 g of polyimide powder and ~55 ml of Vertrel® XF was chilled overnight in a −15° C. refrigerator. The next morning 5 ml of ~0.16 M DP in Vertrel® XF was added and then excess solvent was rapidly pulled off first using a rotary evaporator (~18 min) and then a vacuum pump (~9 min) so as to keep the reaction mixture cold by evaporative cooling. The polyimide powder, now impregnated with DP, was loaded into a 6×9" ziplock polyethylene bag equipped with a gas inlet valve. The bag was purged of air by repeatedly inflating and evacuating the bag 3× with $N_2$ and 3× with tetrafluoroethylene (TFE). Polymerization was started by repeatedly inflating the bag with TFE and allowing polymerization to deflate the bag three times, the deflations taking 55, 50, and 130 minutes respectively. The still yellow polyimide powder was dried overnight (~17 hrs) in a 75° C. vacuum oven. Combustion analysis on the product found 23.99 wt % fluorine.

Samples of this powder were compressed at 100,000 psi at room temperature into three tensile bars measuring 90 mm long by 5 mm to 10 mm wide (dogbone-shaped). These bars were then heated to 405° C. for three hours. In tensile tests these bars broke on average at 1,688 psi with 0.9% elongation. Combustion analysis on the broken pieces found 24.26 wt % fluorine.

E. Polyimide/PTFE Analysing for 27.77% Fluorine

A 500-ml round-bottomed flask loaded with 16.01 g of polyimide powder and ~55 ml of Vertrel™ XF was chilled for 1 hour in a −15° C. refrigerator. About 5 ml of ~0.16 M DP in Vertrel™ XF was added and then excess solvent pulled off first using a rotary evaporator (~12 min) and then a vacuum pump (~7 min) so as to keep the reaction mixture cold by evaporative cooling. The polyimide powder, now impregnated with DP, was loaded into a 6×9" ziplock polyethylene bag equipped with a gas inlet valve. The bag was purged of air by inflating and evacuating the bag 3× with $N_2$ and 3× with tetrafluoroethylene (TFE). Polymerization was started by repeatedly inflating the bag with TFE and allowing polymerization to deflate the bag four times, the deflations taking 21, 23, 23, and 42 minutes respectively. The still yellow polyimide powder was dried overnight (~19 hrs) in a 75° C. vacuum oven. Combustion analysis on the product found 27.77 wt % fluorine.

Samples of this powder were compressed at 100,000 psi at room temperature into three tensile bars measuring 90 mm long by 5 mm to 10 mm wide (dogbone-shaped). These bars were then heated to 405° C. for three hours. In tensile tests these bars broke on average at 1442 psi with 0.6% elongation. Combustion analysis on the broken pieces found 26.32 wt % fluorine. F. Polyimide/PTFE Analyzing for 37.94% Fluorine A round-bottomed flask chilled to ~0° C. was loaded with 16.6 g of polyimide powder, 40 ml of Vertrel™ XF, and 10 ml of ~0.16 M DP in Vertrel™ XF. Excess solvent was rapidly pulled off first using a rotary evaporator and then a pump so as to keep the reaction mixture cold by evaporative cooling. The polyimide powder, now impregnated with DP, was loaded into a 6×9" ziplock polyethylene bag equipped with a gas inlet valve. The bag was purged of air by inflating and evacuating the bag 3× with $N_2$ and 3× with tetrafluoroethylene (TFE). Polymerization was started by repeatedly inflating the bag with TFE and allowing polymerization to deflate the bag over an afternoon and then overnight. The next morning the polyimide powder was recovered. After three days of devolatilization under pump vacuum, combustion analysis on the product found 37.94 wt % fluorine.

Samples of this powder were compressed at 100,000 psi at room temperature into five tensile bars measuring 90 mm long by 5 mm to 10 mm wide (dogbone-shaped). These bars were then heated to 405° C. for three hours. In tensile tests these bars broke on average at 733 psi with 0.4% elongation. Combustion analysis on the broken pieces found 31.85 wt % fluorine.

G. Summary of Results on Polyimide Powder with PTFE Polymerized into its Pores

Table 5 below summarizes the results for parts A through F above.

TABLE 5

| Weight % Fluorine by Combustion Analysis | | | |
|---|---|---|---|
| Starting Polyimide/PTFE | After Bar Pressed and Heated | PSI at Break | Elongation at Break |
| 6.34% | 4.99% | 6,675 psi | 4.7% |
| 14.15% | 13.89% | 1,369 psi | 0.5% |
| 19.93% | 18.76% | 1,385 psi | 0.6% |
| 23.99% | 24.26% | 1,688 psi | 0.9% |
| 27.77% | 26.32% | 1,442 psi | 0.6% |
| 37.94% | 31.85% | 733 psi | 0.4% |

Example 3

Porous Polyimide, Atmospheric Pressure TFE Polymerization; $CO_2$ as Carrier for Initiator A 400-ml stainless steel autoclave was loaded first with 15.05 g of polyimide powder and then with a 100-g layer of dry ice on top. Five ml of ~0.16 M DP in Vertrel® XF was poured over the dry ice. The autoclave was sealed and its contents shaken without any provision for additional cooling. As soon as the contents of the autoclave reached 0° C., the $CO_2$ was vented. The polyimide powder was recovered and chilled on dry ice until it could be transferred to a 6×9" ziplock polyethylene bag equipped with a gas inlet valve. The bag was inflated and evacuated 3× with $N_2$ and 3× with tetrafluoroethylene (TFE). The bag was inflated a final time with TFE. Polymerization was allowed to run 132 minutes until about a quarter of the TFE had been reacted as judged from deflation of the bag. Drying for 21 hours in a 75° C. vacuum oven gave 13.69 g of polyimide powder that analyzed for 2.49 wt % fluorine by combustion analysis.

Example 4

Porous Poly(p-phenylene terephthalamide) Powder, Atmospheric Pressure TFE Polymerization Porous poly(p-phenylene terephthalamide) particulates were prepared by adding poly(p-phenylene terephthalamide) precipitate as made in N-methyl-pyrrolidinone/$CaCl_2$ to water, filtering, rinsing with water, and sucking dry on the filter. A 25.6 g sample of these poly(p-phenylene terephthalamide) particulates was soaked in 30 ml of 0.18 M HFPO dimer peroxide in Vertrel™ XF at −15° C. After 15 minutes, the poly(p-phenylene terephthalamide) was separated by vacuum filtration, stopping filtration as soon as the liquid flow seemed near an end. The poly(p-phenylene terephthalamide), still damp with initiator solution, was transferred to a 6×9" ziplock polyethylene bag equipped with a gas inlet valve. The bag was evacuated and filled 3× with $N_2$ and 3× with TFE. The bag was inflated a final time with TFE and the polymerization allowed to run at room temperature. Over the next several hours the bag was reinflated four times with TFE. Before reinflation, the contents of the bag were shaken and/or squeezed lightly with finger pressure to break up nascent lumps. The polymerization was allowed to continue overnight at room temperature. The next morning the contents of the bag were poured out, avoiding as much as possible entrainment of white PTFE deposits attached to the walls of the bag. After two days under pump vacuum, the product consisting largely of yellow granules plus a few white PTFE flakes from the wall of the bag, weighed 32.9 g for a weight gain of 28%. Taking just the yellow granules, combustion analysis found 15.70 wt % fluorine.

Example 5

Porous Poly(p-phenylene terephthalamide) Powder, Atmospheric Pressure TFE Polymerization A. Lower PTFE Loading Porous poly(p-phenylene terephthalamide) particulates were prepared by adding poly(p-phenylene terephthalamide) precipitate as made in N-methyl-pyrrolidinone/$CaCl_2$ to water, filtering, rinsing with water, and sucking dry on the filter. These particulates were then dried overnight in a 150° C. vacuum oven. A 36 mL sample of ~0.17 M HFPO dimer in Vertrel™ XF at −15° C. was added to 360 ml of room temperature Vertrel™ XF with swirling for 1 minute. This initiator solution was then added immediately to 218.1 g of dried poly(p-phenylene terephthalamide) in a large crystallizing dish. In order to ensure thorough mixing, the contents of the crystallizing dish were worked for 1 minute with a spatula. The resulting poly(p-phenylene terephthalamide) slurry was filtered using a Buchner funnel, the vaccuum being applied for 1 minute so as to leave the poly(p-phenylene terephthalamide) still damp with initiator solution (weight 295 g). The poly(p-phenylene terephthalamide) was transferred to a 8×10" ziplock polyethylene bag equipped with a gas inlet valve. The bag was evacuated and filled 3× with $N_2$ and 3× with TFE. The bag was inflated a final time with TFE to a height of ~3.5 inches and the polymerization allowed to run at room temperature. As TFE polymerization proceeded the bag periodically deflated to a near vacuum and was then reinflated with TFE gas first 10 and again 18 minutes into the run. Throughout the run, the bag was noticeably warm to the touch. After the last deflation, 28 minutes into the run, the contents of the bag were transferred back to a large crystallizing dish. Residual volatiles were removed by first putting under pump vacuum overnight and then in a 150° C. vacuum oven overnight. The product consisting largely of yellow granules, weighed 227.8 g for a weight gain of 4.4% and combustion analysis found 4.16 wt % fluorine or 5 wt % PTFE in reasonable agreement with the measured weight gain. It should be noted that when running with an oven dried poly(p-phenylene terephthalamide) sample and at much larger scale than in Example 4 above, no free PTFE particulates on the walls of the bag or mixed in with the poly(p-phenylene terephthalamide) were apparent to the eye.

B. Intermediate PTFE Loading

Porous poly(p-phenylene terephthalamide) particulates were prepared by adding poly(p-phenylene terephthalamide) precipitate as made in N-methyl-pyrrolidinone/$CaCl_2$ to water, filtering, rinsing with water, and sucking dry on the filter. These particulates were then dried overnight in a 150° C. vacuum oven. A 36 mL sample of ~0.17 M HFPO dimer in Vertrel™ XF at −15° C. was added to 360 ml of room temperature Vertrel™ XF with swirling. This initiator solution was then added immediately to 218 g of dried poly(p-phenylene terephthalamide) in a large crystallizing dish. In order to ensure thorough mixing the contents of the crystallizing dish were worked for 1 minute with a spatula. The resulting poly(p-phenylene terephthalamide) slurry was filtered using a Buchner funnel, the vacuum being applied for only 50 seconds so as to leave the poly(p-phenylene terephthalamide) still damp with initiator solution. The poly(p-phenylene terephthalamide) was transferred to an 8×10" ziplock polyethylene bag equipped with a gas inlet valve. The bag was evacuated and filled 3× with $N_2$ and 3× with TFE. The bag was inflated a final time with TFE and the polymerization allowed to run at room temperature. As TFE polymerization proceeded the bag periodically deflated to a near vacuum and was then reinflated ~2 to 3" tall with TFE gas 8, 14, 25, 37, 46, 62, and 80 minutes into the run. During much of the run, the bag was noticeably warm to the touch. After the last deflation, 98 minutes into the run, the contents of the bag were transferred back to a large crystallizing dish. Residual volatiles were removed by first putting under pump vacuum overnight and then in a 150° C. vacuum oven overnight. The product consisting largely of yellow granules, weighed 244 g for a weight gain of 12% and combustion analysis found 8.40 wt % fluorine or 11 wt % PTFE in reasonable agreement with the measured weight gain.

C. Higher PTFE Loading

Porous poly(p-phenylene terephthalamide) particulates were prepared by adding poly(p-phenylene terephthalamide) precipitate as made in N-methyl-pyrrolidinone/$CaCl_2$ to water, filtering, rinsing with water, and sucking dry on the filter. These particulates were then dried overnight in a 150° C. vacuum oven. A 36 mL sample of ~0.17 M HFPO dimer in Vertrel® XF at −15° C. was added to 360 ml of room temperature Vertrel® XF with swirling. This initiator solution was then added immediately to 217 g of dried poly(p-phenylene terephthalamide) in a large crystallizing dish. In order to ensure thorough mixing the contents of the crystallizing dish were worked for 1 minute with a spoon. The resulting poly(p-phenylene terephthalamide) slurry was filtered using a Buchner funnel, the vaccuum being applied for only 50 seconds so as to leave the poly(p-phenylene terephthalamide) still damp with initiator solution. The poly(p-phenylene terephthalamide) was transferred to a 8×10" ziplock polyethylene bag equipped with a gas inlet valve. The bag was evacuated and filled 3× with $N_2$ and 3× with TFE. The bag was inflated a final time with TFE and the polymerization allowed to run at room temperature. As TFE polymerization proceeded the bag periodically deflated to a near vacuum and was then reinflated ~2 to 4" tall with TFE gas 9, 18, 27, 40, 50, 57, 67, 81, 97, 110, 133, 161, 199, and 250 minutes into the run. During much of the run, the bag was noticeably warm to the touch. After the last deflation, 303 minutes into the run, the contents of the bag were transferred back to a large cystallizing dish. Residual volatiles were removed by first putting under pump vacuum overnight and then in a 150° C. vacuum oven for 73 hours. The product consisting largely of yellow granules, weighed 261 g for a weight gain of 20% and combustion analysis found 12.33 wt % fluorine or 16 wt % PTFE in rough agreement with the measured weight gain.

Example 6

Polymerization of PTFE in Porous Poly(p-phenylene terephthalamide) Fibers

Never dried poly(p-phenylene terephthalamide) fibers, containing 30% to 70% by weight water, was first made ready for TFE polymerization by replacing the water in its pores with a solvent suitable for fluoroolefin polymerization. Thirty-five grams of never dried poly(p-phenylene terephthalamide) fibers were mixed in ajar with 50 ml of trifluoroacetic acid. After standing overnight, the contents of the jar were washed into a chromatography column using additional trifluoroacetic acid. Excess trifluoroacetic acid was drained off. Fifty ml of fresh trifluoroacetic acid were added to the top of the column and excess fluid again drained off, leaving the liquid level in the column about 3 cm above the poly(p-phenylene terephthalamide) layer. Over the following days, the poly(p-phenylene terephthalamide) in the chromatography column was washed in turn with 50 ml trifluoroacetic acid, 50 ml of Freon® E1 ($CF_3CF_2CF_2OCFHCF_3$), 50 ml Freon® E1, 50 ml Freon® E1, and 50 ml of chilled ~0.03 M DP in Freon® E1. The cold DP solution was drained through the poly(p-phenylene terephthalamide) as rapidly as possible while low pressure nitrogen was applied to the top of the column towards the end for the purpose of expelling most unabsorbed fluid. In this operation the nitrogen flow was stopped before drying out of the poly(p-phenylene terephthalamide) particulates occurred. The poly(p-phenylene terephthalamide) having DP initiator in its pores was chilled on dry ice and transferred to a 400 ml autoclave pre-chilled to less than −20° C. The autoclave was evacuated and 25 g of TFE was added, raising pressure to ~78 psi at −43° C. After shaking overnight at room temperature, pressure in the autoclave had decreased to 7 psi. Upon recovery and drying under pump vacuum, the poly(p-phenylene terephthalamide) weighed 38.3 g. The appearance of the composition after recovery was a mix of free flowing particulates and agglomerated particulates, and was cream colored. The poly(p-phenylene terephthalamide) was yellow in color prior to TFE polymerization. Examination by optical microscopy under cross polarizers showed bright, irregularly-shaped poly(p-phenylene terephthalamide) particles with dark PTFE deposits filling most of the pores. Little PTFE was visible at the surface of the poly(p-phenylene terephthalamide) particles. Most often, the dark PTFE areas were 50 microns to 200 microns in diameter. Combustion analysis of one of the agglomerated chunks showed 57.1% fluorine by weight.

Example 7

Porous Poly(m-phenylene isophthalamide) Powder, Atmospheric Pressure TFE Polymerization A. Intermediate PTFE Loading Porous poly(m-phenylene isophthalamide) [MPD-I] particulates were prepared by precipitating MPD-I solution (in dimethylacetamide/$CaCl_2$) in water, washing with water and drying in vacuum at 100° C. A 4.83 g sample of these poly(m-phenylene isophthalamide) particulates was soaked at −15° C. in 40 ml of $CF_2ClCCl_2F$ containing 1.0 ml 0.16 M HFPO dimer peroxide in Vertrel™ XF. After 15 minutes, the poly(m-phenylene isophthalamide) was separated by vacuum filtration, stopping filtration as soon as the liquid flow seemed near an end. The poly(m-phenylene isophthalamide), still damp with initiator solution, was transferred to a 6×9" ziplock polyethylene bag equipped with a gas inlet valve. The bag was evacuated and filled 3× with $N_2$ and 3× with TFE. The bag was inflated a final time with TFE and the polymerization allowed to run at room temperature. Most of the TFE reacted over the next 2.5 hours as seen in the near total deflation of the bag. The contents of the bag were poured out. After ~64 hours under pump vacuum, the product weighed 7.50 g (153% of starting weight) and consisted largely of white lumps not much different in visual appearance than at the start. Combustion analysis found 12.8 wt % fluorine.

B. Higher PTFE Loading

Porous poly(m-phenylene isophthalamide) [MPD-I] particulates were prepared by precipitating MPD-I solution (in dimethylacetamide/$CaCl_2$) in water, washing with water and drying in vacuum at 100° C. A 6.5 g sample of these poly(m-phenylene isophthalamide) particulates was soaked at −15° C. in 50 ml of 0.18 M HFPO dimer peroxide in Vertrel™ XF. After 15 minutes, the poly(m-phenylene isophthalamide) was separated by vacuum filtration, stopping filtration as soon as the liquid flow seemed near an end. The poly(m-phenylene isophthalamide), still damp with initiator solution, was transferred to a 6×9" ziplock polyethylene bag equipped with a gas inlet valve. The bag was evacuated and filled 3× with $N_2$ and 3× with TFE. The bag was inflated a final time with TFE and the polymerization allowed to run at room temperature. Over the next 3 hours the bag deflated and was refilled with TFE five times. The contents of the bag were poured out. After four days under pump vacuum, the product weighed 20.5 g (315% of starting weight) and consisted largely of white lumps not much different in visual appearance than at the start. Combustion analysis found 48.7 wt % fluorine.

Example 8

Porous Poly(m-phenylene isophthalamide) Fibrids, Atmospheric Pressure TFE Polymerization A. Intermediate PTFE Loading Porous [poly(m-phenylene isophthalamide)] fibrids were prepared by precipitating MPD-I solution (in dimethylacetamide/$CaCl_2$) in water under shear, washing with water and drying in vacuum at 100° C. A 6.52 g sample of these poly(m-phenylene isophthalamide) fibrids was soaked at −15° C. in 40 ml of $CF_2ClCCl_2F$ containing 1.0 ml 0.16 M HFPO dimer peroxide in Vertrel™ XF. After 15 minutes, the poly(m-phenylene isophthalamide) was separated by vacuum filtration, stopping filtration as soon as the liquid flow seemed near an end. The poly(m-henylene isophthalamide), still damp with initiator solution, was transferred to a 6×9" ziplock polyethylene bag equipped with a gas inlet valve. The bag was evacuated and filled 3× with $N_2$ and 3× with TFE. The bag was inflated a final time with TFE and the polymerization allowed to run at room temperature. Most of the TFE reacted over the next 1.5 hours as seen in the near total deflation of the bag. The contents of the bag were poured out. After a weekend under pump vacuum, the product weighed 9.84 g (151% of starting weight) and consisted largely of flat white clumps of fibrids not much different in visual appearance than at the start. Combustion analysis found 40.5 wt % fluorine.

B. Higher PTFE Loading

Porous poly(m-phenylene isophthalamide) [MPD-I] particulates were prepared by precipitating MPD-I solution (in dimethylacetamide/$CaCl_2$) in water, washing with water and drying in vacuum at 100° C. A 6.5 g sample of these poly(m-phenylene isophthalamide) particulates was soaked at −15° C. in 50 ml of 0.18 M HFPO dimer peroxide in Vertrel® XF. After 15 minutes, the poly(m-phenylene isophthalamide) was separated by vacuum filtration, stopping filtration as soon as the liquid flow seemed near an end. The poly(m-phenylene isophthalamide), still damp with initiator solution, was transferred to a 6×9" ziplock polyethylene bag equipped with a gas inlet valve. The bag was evacuated and filled 3× with $N_2$ and 3× with TFE. The bag was inflated a final time with TFE and the polymerization allowed to run at room temperature. Over the next 3 hours the bag deflated and was refilled with TFE five times. The contents of the bag were poured out. After four days under pump vacuum, the product weighed 18.1 g (278% of starting weight) and consisted largely of flat white clumps of particulates not much different in visual appearance than at the start. Combustion analysis found 55.3 wt % fluorine.

Example 9

Ultrasuede®, Atmospheric Pressure TFE Polymerization

A rectangular sample of blue Ultrasuede® (a leather mimic believed to be a foamed polyurethane) weighing 2.1 g and measuring 7.6 cm×8.2 cm×0.09 cm thick, was immersed in a ~0.16 M solution of DP in Vertrel® XF maintained at −15° C. After 15 minutes, the Ultrasuede® was removed from the initiator solution and excess fluid allowed to drain for five or 10 seconds. The Ultrasuede® still wet with absorbed initiator was transferred to a 6×9" ziplock polyethylene bag provided with a gas inlet valve. The bag was sealed, evacuated and inflated 3× with $N_2$ and 3× with TFE. The bag was inflated a fourth time with TFE. Using an exterior clamp, all but a corner of the Ultrasuede® sample was held away from contact with the walls of the bag. The Ultrasuede® was recovered 23 hours later and devolatilized for 3 days under pump vacuum. While unchanged in appearance, the Ultrasuede® weighed 2.4 g, ~14% more than at the start. Combustion analysis found 6.00 wt % fluorine. A drop of distilled water placed on either side of the Ultrasuede® sample treated here took ~46 minutes to show initial wetting and never soaked into the Ultrasuede® prior to evaporation. For comparison purposes, an untreated Ultrasuede® sample was found to completely absorb a drop of water within about one minute on one side and to not be wetted at all by water on the reverse side (combustion analysis found 0.14 wt % F on the starting Ultrasuede® suggesting a fluorinated finish at the start).

Example 10

Pigskin and Cowskin

A 5-cm square of commercial beige pigskin purchased at retail (chrome tanned split, one side suede, reverse side rough) weighing 1.69 g and measuring ~0.15 cm thick was immersed in a ~0.16 M solution of DP in Vertrel® XF maintained at −15° C. A 5 cm square of commercial black cowhide purchased at retail (chrome tanned split, suede both sides) weighing 2.09 g and measuring ~0.12 cm thick was immersed in a ~0.16 M solution of DP in Vertrel® XF maintained at −15° C. After 60 minutes, the two leather samples were removed from the initiator solution and excess fluid allowed to drain for five or 10 seconds. The leather samples still wet with absorbed initiator were transferred to a 6×9" ziplock polyethylene bag provided with a gas inlet valve. The bag was sealed, evacuated and inflated 3× with $N_2$ and 3× with TFE. The bag was inflated a fourth time and the bag and its contents tumbled overnight at room temperature. After recovery, the leather samples were devolatilized to constant weight under pump vacuum. The pigskin, slightly darkened in appearance, now weighed 1.86 g for a 10% weight gain and analysed for 9.56 wt % F by combustion analysis. While unchanged in appearance, the cowskin weighed 2.25 g for a 5% weight gain and analyzed for 9.15 wt % F by combustion analysis. It should be noted that the starting pigskin and cowhide samples analyzed for 1.77 and 0.39 wt % F before the treatment described here.

Example 11

Liquid Phase Perfluoromonomer

A. In Wood Under Inert Atmosphere

A jar was chilled to about −15° C. and 25 ml of PMD and 2 ml of ~0.16 M DP in $CF_3CF_2CFHCFHCF_3$ solvent were added. A cube of redwood ~1.9 cm on a side weighing 2.46 g was immersed in the solution contained in the jar for about 1 hour at −15° C. The redwood cube was removed, allowed to drain and then transferred to a 20.32 cm×25.4 cm zip lock polyethylene bag (Brandywine Bag Co., part number 301630) equipped with a polypropylene gas inlet valve. The bag was clamped shut, inflated and evacuated 3 times with nitrogen, and allowed to sit over the weekend. The cube was removed and a few pieces of white polymer rubbed off its surface with a spatula. After devolatilizing for 9 days under pump vacuum at room temperature, the cube weighed 4.45 g for a 81% weight gain. One side of the cube was lightly sanded revealing an attractive brown surface slightly darker in appearance. A drop of water placed on the surface remained there for about two hours until it evaporated. A drop of water placed on an untreated redwood cube wet the surface within a minute and took about 30 minutes to soak into the cube, having spread out into a visibly large wet area on the cube.

B. In Wood Under TFE Atmosphere

A cube of redwood, ~1.9 cm on a side and weighing 2.27 g was immersed in the PMD/DP solution left over from part B of this Example for 1 hour at −15° C. The redwood cube was removed, allowed to drain and then transferred to a 20.32 cm×25.4 cm zip lock polyethylene bag (Brandywine Bag Co., part number 301630) equipped with a polypropylene gas inlet valve. The bag was clamped shut, inflated and evacuated three times with nitrogen, inflated and evacuated three times with TFE, loosely inflated with TFE, and allowed to sit over a three days. The cube was removed along with 2.9 g of PTFE. Most of the PTFE removed was loose but some of it was scraped off of the redwood cube. After devolatilizing for 9 days under pump vacuum at room temperature, the cube weighed 4.51 g for a 99 percent weight gain. One side of the cube was light sanded revealing an attractive silvery brown surface darker in appearance than at the start. A drop of water placed on the surface remained on the surface of the cube for about two hours until it evaporated. A drop of water placed on an untreated redwood cube wet the surface of the cube within a minute and took about 30 minutes to soak into the cube, having spread out into a visibly large wet area on the cube.

What is claimed is:

1. A composition of matter comprising a substrate, having a surface, and fluoropolymer powder; wherein the substrate is an open pore structure having interconnecting pores throughout said substrate; wherein the fluoropolymer powder is present within the subsurface pores of, and on the surface of, the substrate of said composition; wherein the substrate does not provide gross entrapment of the fluoropolymer between separate fibers; and wherein the fluoropolymer is present at a level from about 0.1 percent to about 300 percent of the weight of said substrate.

2. The composition of claim 1 wherein the substrate is selected from the group consisting of paper, molded polyimide parts, polyimide powder, aramid, polyurethane and leather compositions.

3. The composition of claim 1 wherein the substrate is selected from the group consisting of porous poly(p-phenylene terephthalamide) and poly(p-phenylene terephthalamide) copolymers in particulate, pulp or fiber form, and poly(m-phenylene isophthalamide) and poly(m-phenylene isophthalamide) copolymers in particulate, fibrid or fiber form.

4. A composition of claim 1 wherein the fluoropolymer is a homopolymer or copolymer of fluorinated and partially fluorinated olefins selected from the group consisting of tetrafluoroethylene, trifluoroethylene, vinylidene fluoride, vinyl fluoride, chlorotrifluoroethylene, hexafluoroisobutylene, perfluoro methyl vinyl ether, perfluoro propyl vinyl ether, perfluoro (2-methylene-4-methyl)-1,3-dioxolane, 4,5 difluoro-2,2-bis (trifluoromethyl)-1,3-dioxole and hexafluoroisobutylene.

5. A blend comprising 1 to 99%, by weight of the blend, of the composition of claim 1; and 1 to 99%, by weight of the blend, of fluoropolymer.

6. The composition of matter of claim 5 in which the fluoropolymer is polytetrafluoroethylene.

7. A blend comprising 1 to 99%, by weight of the blend, of the composition of claim 1; and 1 to 99%, by weight of the blend, of poly(imide) or aramid.

8. The blend of claim 5 wherein the composition of claim 1 is dispersed in the blend.

9. The blend of claim 7 wherein the composition of claim 1 is dispersed in the blend.

10. A composition of matter comprising a substrate, having a surface, and fluoropolymer powder; wherein the substrate is an open pore structure having interconnecting pores throughout said substrate; wherein the fluoropolymer powder is present within the subsurface pores of, and on the surface of, the substrate of said composition; wherein the substrate does not provide gross entrapment of the fluoropolymer between separate fibers; wherein the fluoropolymer is present at a level from about 0.1 percent to about 300 percent of the weight of said substrate; and wherein the substrate is dispersed in the fluoropolymer powder.

11. The composition of claim 10 wherein the substrate is selected from the group consisting of microscopic particulates, microscopic fibers, coarse particulates, pulp, fibrids, chunks, blocks, wood, wood by-products, molded polyimide parts, polyimide powder, aramid, polyurethane and leather compositions.

12. The composition of claim 10 wherein the substrate is selected from the group consisting of porous poly(p-phenylene terephthalamide) and poly(p-phenylene terephthalamide) copolymers in particulate, pulp or fiber form, and poly(m-phenylene isophthalamide) and poly(m-phenylene isophthalamide) copolymers in particulate, fibrid or fiber form.

13. The composition of claim 10 wherein the fluoropolymer is a homopolymer or copolymer of fluorinated and partially fluorinated olefins selected from the group consisting of tetrafluoroethylene, trifluoroethylene, vinylidene fluoride, vinyl fluoride, chlorotrifluoroethylene, hexafluoroisobutylene, perfluoro methyl vinyl ether, perfluoro propyl vinyl ether, perfluoro (2-methylene-4-methyl)-1,3-dioxolane, 4,5 difluoro-2,2-bis (trifluoromethyl)-1,3-dioxole and hexafluoroisobutylene.

14. A blend comprising 1 to 99%, by weight of the blend, of the composition of claim 10; and 1 to 99%, by weight of the blend, of fluoropolymer.

15. The composition of matter of claim 14 in which the fluoropolymer is polytetrafluoroethylene.

16. A blend comprising 1 to 99%, by weight of the blend, of the composition of claim 10; and 1 to 99%, by weight of the blend, of poly(imide) or aramid.

17. The composition of claim 1 wherein the fluoropolymer completely fills the pores of the substrate.

18. The composition of claim 10 wherein the fluoropolymer completely fills the pores of the substrate.

* * * * *